United States Patent
Chan et al.

(10) Patent No.: US 9,946,804 B2
(45) Date of Patent: Apr. 17, 2018

(54) DISPLAYING HISTORICAL DATA ASSOCIATED WITH DATA VALUES WITHIN BUSINESS INTELLIGENCE REPORTS

(71) Applicants: Pak Man Chan, Vancouver (CA); Nicholas Chiu, Vancouver (CA); Mehdi Seblani, Vancouver (CA)

(72) Inventors: Pak Man Chan, Vancouver (CA); Nicholas Chiu, Vancouver (CA); Mehdi Seblani, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 941 days.

(21) Appl. No.: 13/970,554

(22) Filed: Aug. 19, 2013

(65) Prior Publication Data

US 2015/0052099 A1  Feb. 19, 2015

(51) Int. Cl.
  *G06F 17/30* (2006.01)
  *G06Q 10/06* (2012.01)

(52) U.S. Cl.
  CPC ..... *G06F 17/30876* (2013.01); *G06Q 10/063* (2013.01)

(58) Field of Classification Search
  CPC .................................................. G06Q 10/063
  See application file for complete search history.

(56) References Cited

U.S. PATENT DOCUMENTS

| | | | |
|---|---|---|---|
| 5,899,988 A | 5/1999 | De Pledge et al. | |
| 6,775,675 B1 | 8/2004 | Nwabueze et al. | |
| 7,346,839 B2 | 3/2008 | Acharya et al. | |
| 7,580,928 B2 | 8/2009 | Wu et al. | |
| 7,900,151 B2 | 3/2011 | Gebhard et al. | |
| 8,060,076 B2 | 11/2011 | Shiver et al. | |
| 8,261,193 B1* | 9/2012 | Alur | G06Q 10/101 715/742 |

(Continued)

OTHER PUBLICATIONS

Battle, Robert, and Edward Benson. "Bridging the semantic Web and Web 2.0 with representational state transfer (REST)." Web Semantics: Science, Services and Agents on the World Wide Web 6.1 (2008): 61-69. (Year: 2008).*

*Primary Examiner* — Frank D Mills
(74) *Attorney, Agent, or Firm* — Mintz Levin Cohn Ferris Glovsky and Popeo, P.C.

(57) ABSTRACT

The current subject matter describes displaying historical data associated with one or more data values within a business intelligence report. A graphical user interface executed by a computing device can receive, from a user, a request for display of historical data associated with a specified/selected data value in a business intelligence report. Subsequently, a representational state transfer engine (RESTful engine), which can be connected to a server system connected to the computing device, can execute a representational state transfer service (RESTful service) to fetch historical data from current and past instances associated with the data value. Then, the RESTful engine can write the fetched historical data to a file. The RESTful engine can generate or determine a uniform resource locator (URL) to the file, and can send the URL to the computing device. When the URL is selected by the user, the computing device can display the file.

18 Claims, 7 Drawing Sheets

(56) References Cited

U.S. PATENT DOCUMENTS

| | | | |
|---|---|---|---|
| 8,321,792 B1* | 11/2012 | Alur | G06Q 10/10 |
| | | | 715/742 |
| 8,356,046 B2 | 1/2013 | Hille-Doering et al. | |
| 8,375,330 B2 | 2/2013 | Kieselbach | |
| 8,381,180 B2 | 2/2013 | Rostoker | |
| 8,396,827 B2 | 3/2013 | Gross et al. | |
| 8,442,515 B2 | 5/2013 | Stump et al. | |
| 8,467,921 B2 | 6/2013 | Smith et al. | |
| 8,682,752 B2* | 3/2014 | Bhatia | G06Q 40/12 |
| | | | 705/30 |
| 2002/0097277 A1 | 7/2002 | Pitroda | |
| 2004/0083147 A1 | 4/2004 | Aoki | |
| 2005/0289137 A1 | 12/2005 | Wu et al. | |
| 2006/0004842 A1 | 1/2006 | Wu et al. | |
| 2006/0167704 A1 | 7/2006 | Nicholls et al. | |
| 2008/0046804 A1* | 2/2008 | Rui | G06F 17/246 |
| | | | 715/212 |
| 2010/0088410 A1 | 4/2010 | Ridley | |
| 2010/0145946 A1* | 6/2010 | Conrad | G06F 17/30427 |
| | | | 707/736 |
| 2011/0016379 A1* | 1/2011 | McColl | G06F 17/246 |
| | | | 715/219 |
| 2012/0011195 A1* | 1/2012 | Prish | G06F 17/246 |
| | | | 709/203 |
| 2013/0060751 A1 | 3/2013 | Cooke | |
| 2014/0129913 A1* | 5/2014 | Advani | G06Q 30/0202 |
| | | | 715/226 |
| 2014/0136936 A1* | 5/2014 | Patel | G06F 17/2247 |
| | | | 715/212 |

* cited by examiner

| COUNTRY | SALES PERSON | ORDER AMOUNT |
|---|---|---|
| Italy | Robert King | 68,252.70 |
| USA | Nancy Davolio | 1,285,446.49 |
| USA | Janet Leverling | Generate Historical Data |
| USA | Margaret Peacock | |

FIG. 3

| | A | B | C | D |
|---|---|---|---|---|
| 1 | Timestamp | Country | Sales_Person | Order_Amount |
| 2 | 2013-04-01T22:58:13.536Z | USA | Nancy Davolio | 1098734.12 |
| 3 | 2013-04-02T22:59:34.495Z | USA | Nancy Davolio | 1499171.98 |
| 4 | 2013-04-03T23:01:23.134Z | USA | Nancy Davolio | 1504738.15 |
| 5 | 2013-04-04T23:03:55.698Z | USA | Nancy Davolio | 44983.3 |
| 6 | 2013-04-05T23:04:41.722Z | USA | Nancy Davolio | 1285446.49 |

DISPLAYING HISTORICAL DATA ASSOCIATED WITH DATA VALUES WITHIN BUSINESS INTELLIGENCE REPORTS

TECHNICAL FIELD

The subject matter described herein relates to displaying historical data associated with data values within a business intelligence report.

BACKGROUND

Various reports include data values that are historically generated by performing computations on corresponding data obtained from various data sources. Conventionally, such reports merely display the data values, and there is no tracking of historical data associated with the computation of those data values. Thus, such reports generally do not allow a user to access historical data associated with various data values in those reports.

SUMMARY

The current subject matter relates to displaying historical data associated with one or more data values within a business intelligence report. A graphical user interface executed by a computing device can receive, from a user, a request for display of historical data associated with a specified/selected data value in a business intelligence report. Subsequently, a representational state transfer engine (RESTful engine), which can be connected to a server system connected to the computing device, can execute a representational state transfer service (RESTful service) to fetch historical data from current and past instances associated with the data value. Then, the RESTful engine can write the fetched historical data to a file. The RESTful engine can determine or generate a uniform resource locator (URL) to the file, and can send the URL to the computing device. When the URL is selected by the user, the computing device can display the file. Related methods, apparatuses, systems, techniques and articles are also described.

In one aspect, a client browser of a computing device can receive a request to display historical data associated with one or more data values of a business intelligence report. The computing device can send a request for generating the historical data to a server system executed in an application layer. The server system can request a representational state transfer engine for a uniform resource locator identifying a location of a file to be filled with the historical data. The representational state transfer engine can execute a representational state transfer service to fetch the historical data from past instances of the business intelligence report and to fill the file with the historical data. The representational state transfer engine can send the uniform resource locator to the server system. The computing device can receive the uniform resource locator from the server system. The client browser of the computing device can display the uniform resource locator. When the uniform resource locator is selected, the client browser can display the file with the historical data.

In some variations, one or more of the following can be implemented individually or in any feasible combination. The file can be a comma separated values (CSV) file. The uniform resource locator can be a web link. The fetching of the historical data and the filling of the file with the historical data can include: obtaining, at the representational state transfer engine, past instances of the business intelligence report; generating, by the representational state transfer engine, identifiers identifying the past instances; fetching, by the representational state transfer engine, data included in associated rows of the past instances identified by the identifiers; and writing, by the representational state transfer engine, the fetched data in the file. The representational state transfer engine can include at least one data processor that can execute the representational state transfer service. The representational state transfer service can be a computing application hosted by the server system to fetch and deliver historical data to the computing device. The past instances of the business intelligence report can be saved in one or more databases connected to the server system. The computing device can be connected to the server system via a communication network. This communication network can be Internet.

In another aspect, a computing device is described. The computing device can receive a request to display historical data associated with one or more data values of a business intelligence report. The computing device can send, to a server system executed in an application layer, a request for fetching the historical data from past instances of the business intelligence report. The historical data being fetched can be based on the request. The fetched historical data can be filled/inserted into a file. The computing device can receive a uniform resource locator from the server system. The uniform resource locator can identify a location of the file. The computing device can display the uniform resource locator. The computing device can display the file with the historical data on a client browser when the uniform resource locator is selected.

In some variations, one or more of the following can be implemented individually or in any feasible combination. The client browser can receive the request to display the historical data. The fetching and the filling of the historical data can include: fetching, by a representational state transfer service executed by a representational state transfer engine executed by the server system, the historical data from past instances of the business intelligence report; and writing, by the representational state transfer engine, the fetched historical data in the file. The business intelligence report can be executed on an operating system of the computing device. This operating system can be independent of a structure of the business intelligence report.

In yet another aspect, a system comprises a computing device and a server system. The computing device can include a client browser to receive a request to display historical data associated with one or more data values of a business intelligence report. The server system can be connected to the computing device via a communication network. The server system can receive the request to display historical data. The server system can execute a representational state transfer engine executing a representational state transfer service to fetch the historical data from past instances of the business intelligence report and to fill a file with the historical data. The server system can send a uniform resource locator identifying a location of the file to the computing device. The computing device can display the uniform resource locator on the client browser.

In some variations, one or more of the following can be implemented individually or in any feasible combination. The system can further include at least one database to store the past instances of the business intelligence report. The file can be a comma separated values (CSV) file. The uniform resource locator can be a web link. The client browser can be displayed on a display screen of the computing device.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, historical data associated with data values within a business intelligent report can be tracked and displayed. Such a displaying of the historical data can allow managers and other personnel to track computations and/or other modifications performed historically so as to obtain particular data values. Thus, a significant amount of time of those managers and other personnel can be saved. Further, as representational state transfer (REST) architectural style is used for fetching historical data, the business intelligence application that fetches and displays the historical data can run on any operating system, such as WINDOWS (any WINDOWS, such as XP, 7, 8 or any previous or later version), MAC OS, iOS, LINUX, UNIX, ANDROID, RIM, UBUNTU TOUCH, and any other platform. Moreover, REST enables simpler exchange of information within the computing landscape than conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
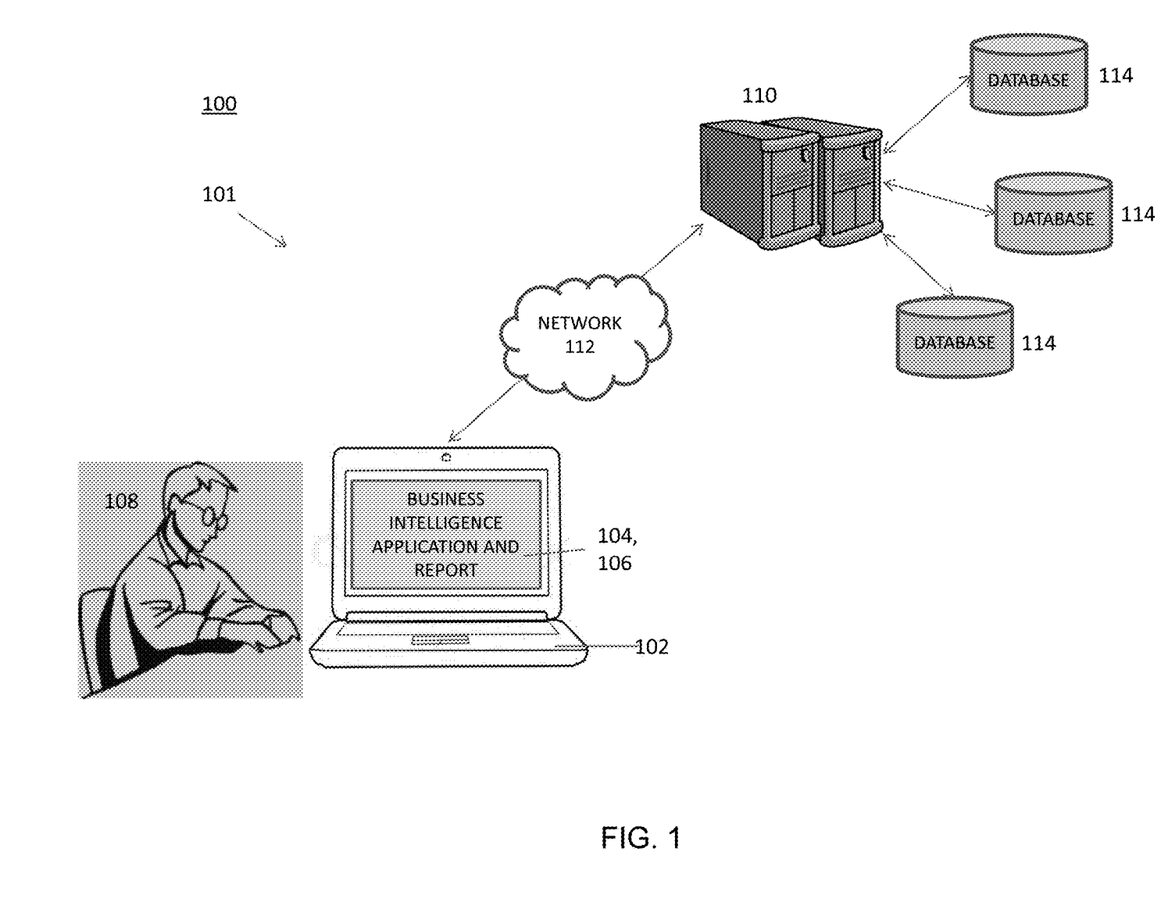
FIG. 1 is a system-diagram illustrating a computing landscape for generating and displaying a business intelligence report.

FIG. 1 is a system-diagram 100 illustrating a computing landscape 101 for generating and displaying a business intelligence report. The computing landscape 101 can include a computing device 102 that can execute a business intelligence application 104. The business intelligence application 104 can design and generate business intelligence reports 106 accessible by a user 108. The computing device 102 can be connected to a server system 110 via a communication network 112. The server system 110 can either include (for example, embed) or be connected to multiple databases 114 where the generated business intelligence reports 106 and their past instances can be stored. Although the databases 114 have been shown external to the server system 110, in some other implementations, the databases 114 can be a part of a memory device of the server system 110.

The business intelligence reports 106 can include data values that can be historically generated by performing computations on corresponding data in the business intelligence reports 106. Additionally, as described further below, the business intelligence application 104 can write, to a file (for example, a comma separated values (CSV) file), historical data associated with one or more data values within a business intelligence report 106. The business intelligence application 104 can store the historical data in the file (for example, CSV file) in a database 114, and can display a uniform resource locator (URL) identifying a location of storage of the file on the computing device 102. When the user selects (for example, clicks on) the URL, the business intelligence application 104 can display the file including the historical data.

The computing device 102 can be a desktop computer, a laptop, a cellular phone, or any other computing device. The computing device 102 can include at least one output device, such as a display device that can execute a client browser on a display screen, and/or any other output device. The computing device 102 can further include at least one input device, such as a keyboard, a mouse, a touch-screen system, a joystick, and/or any other input device.

The business intelligence application 104 can be a computing software application that can gather, store, and/or provide access to data to the user 108. The business intelligence application 104 can be an enterprise resource planning application. In one example, the business intelligence application 104 can display a hierarchy of performance metrics and benchmarking that can inform the user 108 regarding a progress of a business entity (for example, an employer of the user 108) toward business goals. In another implementation, the business intelligence application 104 can display analytics, and quantitative processes required by a particular business entity for determining optimal business decisions. In yet another implementation, the business intelligence application 104 can display reporting infrastructure within the business entity. One example of the business application can be CRYSTAL REPORTS, which is currently developed by SAP AG.

The business intelligence reports 108 can be reports generated by the business intelligence application 104, such as CRYSTAL REPORTS. The business intelligence reports 108 can display data in a tabular format, such as a spreadsheet. In some implementations, the data can be further displayed in a graphical format, such as a bar chart, a pie-chart, a line-drawing, a hierarchical tree structure, and/or any other format.

The user 108 can be an individual who is authorized to operate the business intelligence application 104. In another implementation, the user can be an automated system. The user 108 can also be referred to as an entity, a human being, a machine, or the like.

The server system 110 can include one or more data processors and one or more storage devices, such as one or more memories. The one or more data processors can have a read and/or write access to the one or more storage devices. The communication network 112 can be one or more of: a local area network, a wide area network, internet, intranet, Bluetooth network, infrared network, and other networks. The databases 114 can be at least some of: SAP databases, spreadsheets (for example, MICROSOFT EXCEL spreadsheets), ORACLE databases, SQL server databases, and/or local file system data.

The uniform resource locator (URL) can be a web link. The web link can be a link identifying locations associated with either Internet or Intranet. A URL for each corresponding data value can be unique such that each URL uniquely identifies a respective data value for which historical data is requested.

Figure 2:
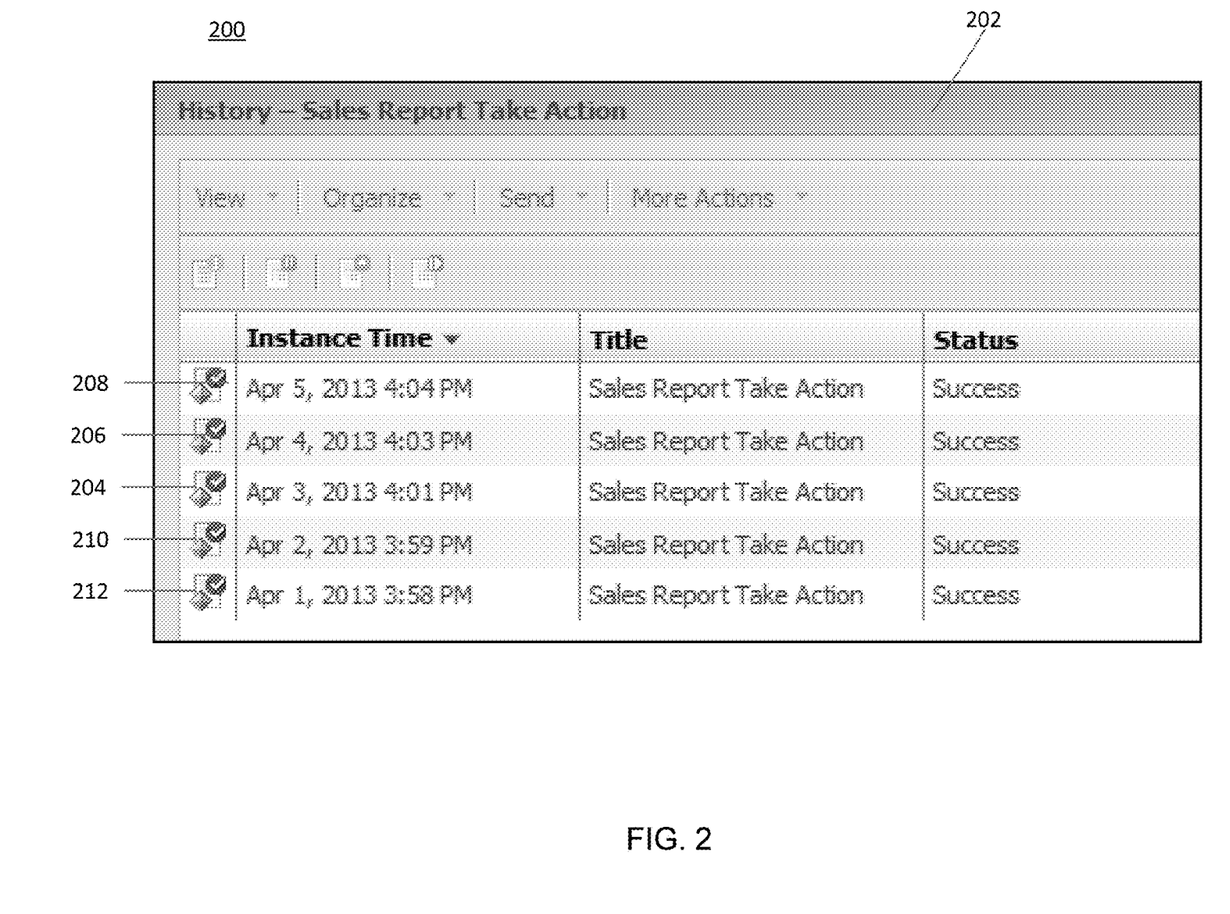
FIG. 2 is a diagram illustrating a graphical user interface of the business intelligence application that allows a user to specify amount of historical data to be generated.

FIG. 2 is a diagram 200 illustrating a graphical user interface 202 of the business intelligence application 104 that allows a user 108 to specify amount of historical data to be generated. The graphical user interface 202 shows one example where the business intelligence application 104 allows the user 108 to define this amount of data as data for the past 5 days (including the current day). In other examples, the business intelligence application 104 can allow the user 108 to specify amount of data with any desired or required pattern of history. For example, in one implementation, the business intelligence application 104 can allow the user 108 to select a particular instance (for example, instance 204) on the graphical user interface 202 so that the historical data includes data associated with the selected instance (for example, instance 204) and the subsequent instances (for example, instances 206 and 208) and may not include the previous instances (for example, instances 210 and 212).

Figure 3:
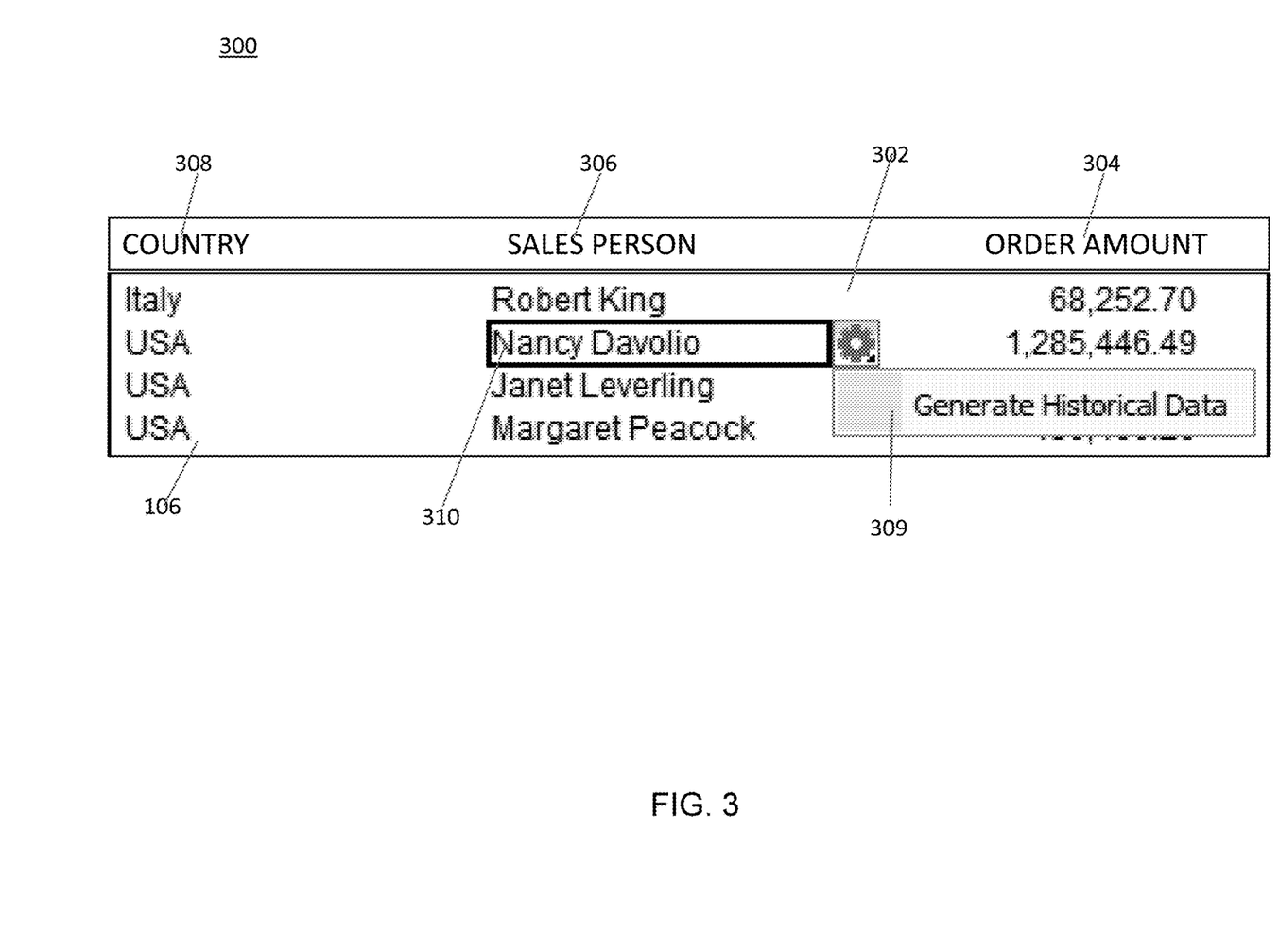
FIG. 3 is a diagram illustrating a graphical user interface of the business intelligence application that can display the business intelligence report.

FIG. 3 is a diagram 300 illustrating a graphical user interface 302 of the business intelligence application 104 that can display the business intelligence report 106. The graphical user interface 302 and the business intelligence report 106 can display order amounts 304 associated with corresponding sales persons 306 and respective countries 308 when fetched by clicking the Generate Historical Data Button 309. Each order amount 304 can be an amount of revenue generated by a corresponding sales person 306 in a respective country 308. The business intelligence application 104 can allow the user 108 to select one or more data values within the portion of the business intelligence report 106 displayed on the graphical user interface 302. When the user 108 selects a particular data value 310 and clicks the Generate Historical Data button 309, the business intelligence application 104 can fetch historical data associated with the selected data value in accordance with the amount of historical data specified by the user 108 on the graphical user interface 202. The fetched historical data can include a numerical measure (for example, order amount 304) and timestamps of the scheduled instances, such as timestamps for instances 204, 206, 208, 210, and 212.

The business intelligence application 104 can write the fetched historical data to a file, such as a comma separated values (CSV) file. The business intelligence application 104 can then determine or generate a uniform resource locator (URL) identifying a location of the file. The business intelligence application can subsequently display the URL along with a graphical drawing showing a trend or a pattern associated with the generated historical data.

Figure 4:
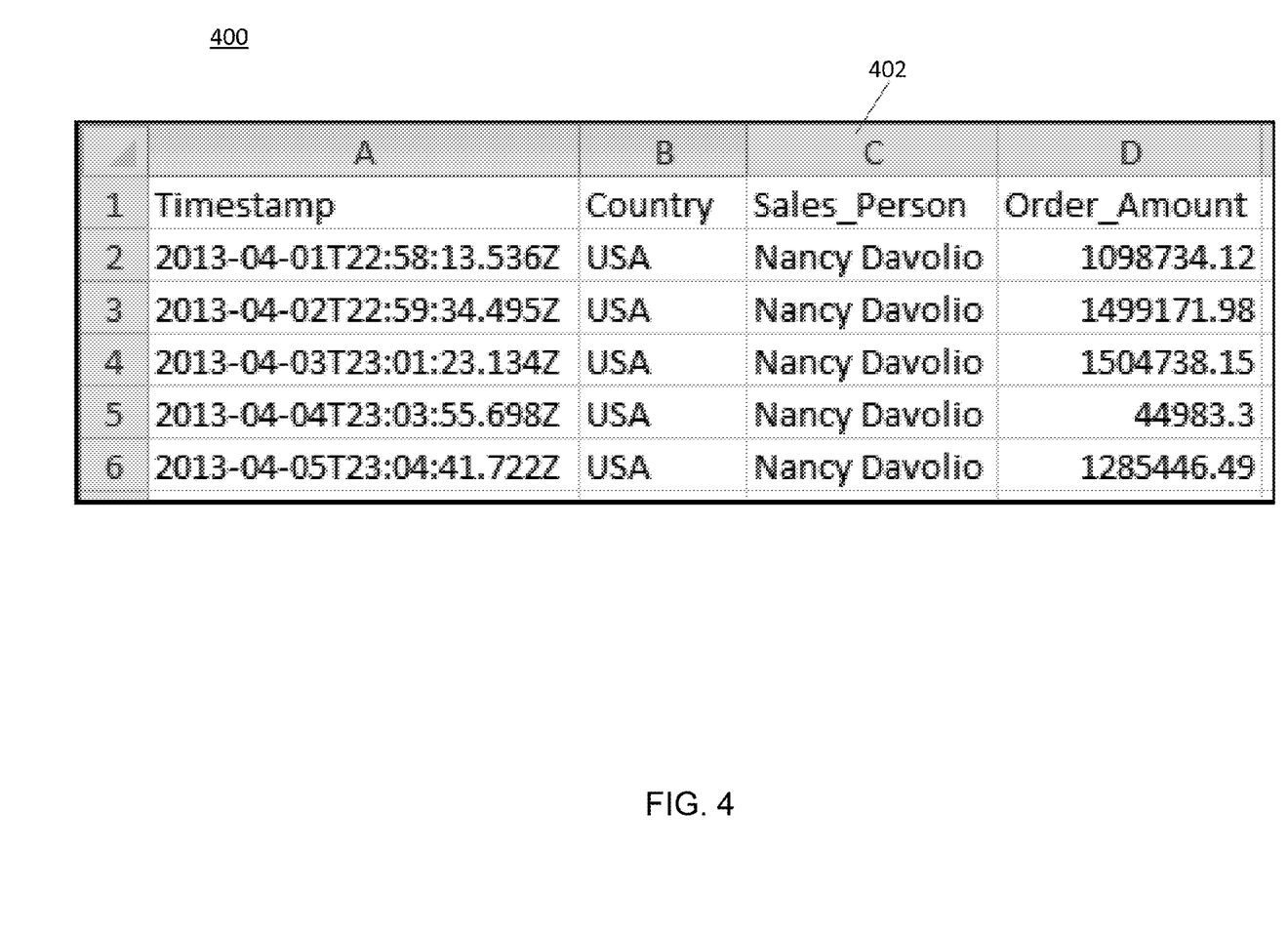
FIG. 4 is a diagram illustrating historical data within a file, such as a comma separated values (CSV) file.

FIG. 4 is a diagram 400 illustrating historical data 402 within an exported file, such as a comma separated values (CSV) file. This historical data 402 can be specific to the data value 310 selected by the user 108. The historical data 402 can be in accordance with the amount of data specified by the user 108 on the graphical user interface 202. Although the historical data is described as being exported to a file that is displayed when the user 108 selects a uniform resource locator (URL) identifying a location of the file, in other implementations, the business intelligence application 104 can automatically display the historical data on either another portion of the graphical user interface 302 or in another window or tab. The business intelligence application 104 can display the URL along with a graphical drawing 502 (described below) showing a trend or pattern of the historical data on either the same graphical user interface/file/tab/window or a different graphical user interface/file/tab/window. The display of the historical data 402 can advantageously allow managers and/or other personnel to track modifications performed historically so as to obtain data associated with the particular data value 310.

Figure 5:
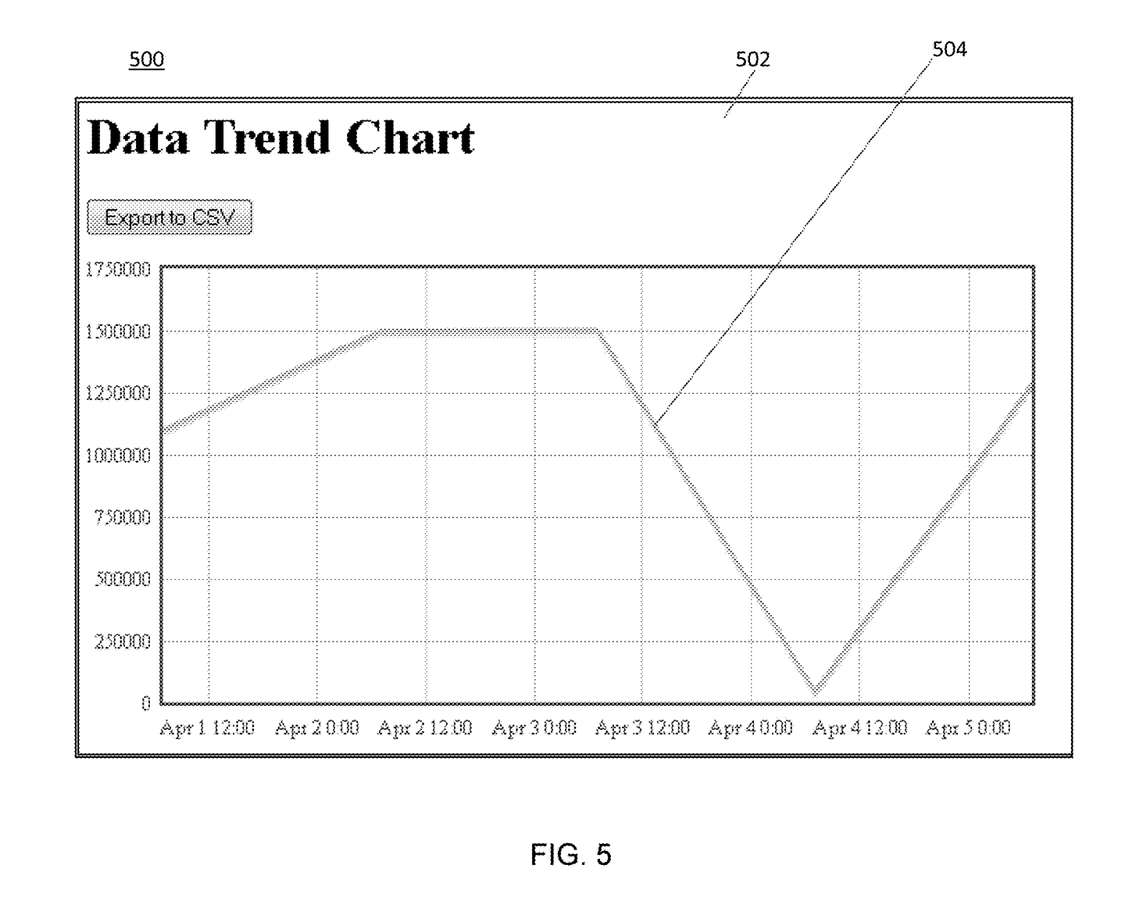
FIG. 5 is a diagram illustrating a graphical drawing displaying a trend or pattern of the historical data.

FIG. 5 is a diagram 500 illustrating a graphical drawing 502 displaying a trend or pattern of the historical data 402. The business intelligence application 104 can generate the graph 504 in the graphical drawing 502 based on values in the historical data 402. The business intelligence application 104 can display the graphical drawing 502 along with the historical data 402 on either the same graphical user interface/file/tab/window or a different graphical user interface/file/tab/window. The display of the graphical drawing 502 can advantageously allow managers and other personnel to track a trend or pattern of modifications performed historically so as to obtain data associated with the particular data value 310.

Figure 6:
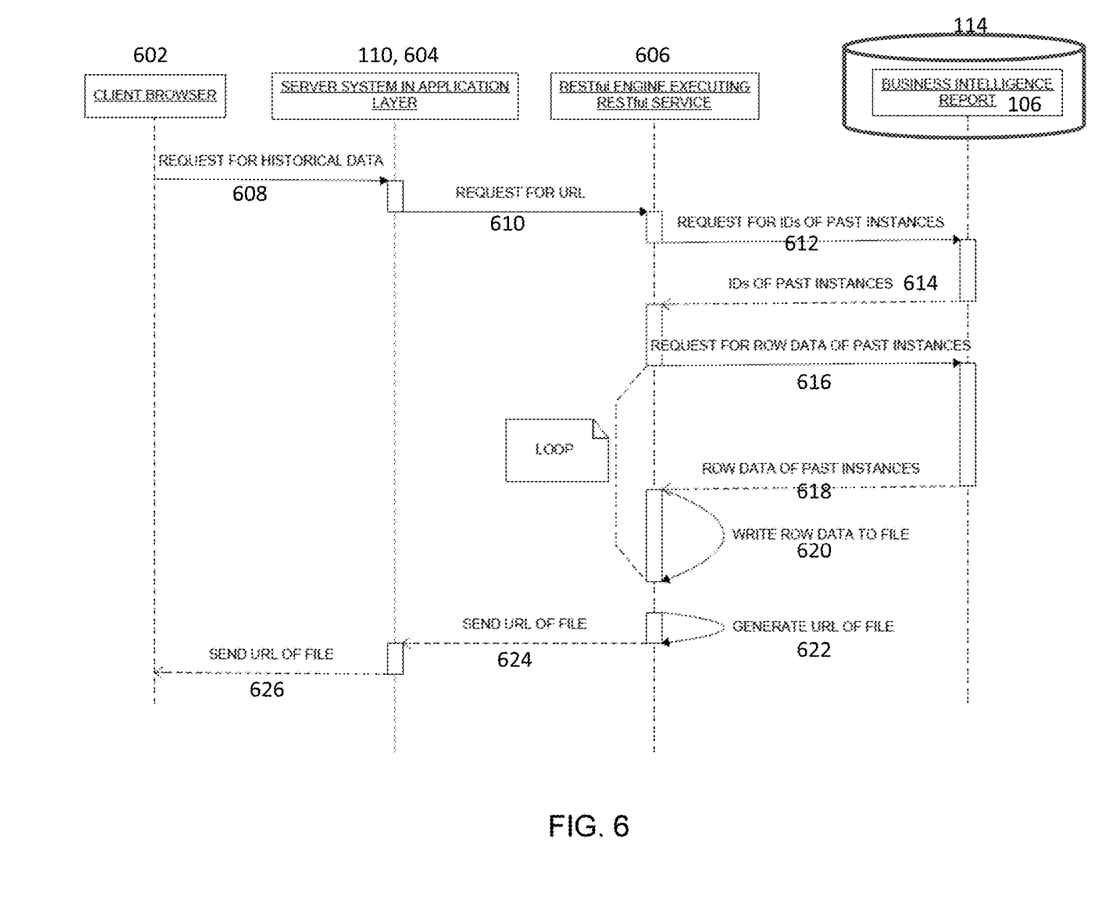
FIG. 6 is a system diagram illustrating a computing landscape for displaying historical data associated with a data value within a business intelligence report.

FIG. 6 is a system-diagram 600 illustrating a computing landscape 601 for displaying historical data 402 associated with a data value 310 within a business intelligence report 106. The computing landscape 601 can include a client browser 602 executed on the computing device 102, an application layer 604 executing the server system 110, a representational state transfer engine (RESTful engine) 606 executed by the server system 110, and business intelligence reports 106 stored in the databases 114. The RESTful engine 606 can execute a representational state transfer service (RESTful service) to look-up historical data from the business intelligence reports 106 so as to write the historical data to a file, such as a comma separated values (CSV) file. The RESTful engine 606 and the RESTful service can be an engine and a service, respectively, associated with representational state transfer (REST), which is a style of software architecture for distributed systems such as the World Wide Web. The RESTful engine 606 can be one or more data processors that can execute a RESTful service, which can be an application hosted by the back-end server system 110 to serve historical data to the computing device 102.

When the user 108 selects the data value 310, the client browser 602 can send, at 608, a message requesting historical data associated with the data value 310 to the server system 110 in the application layer 604. The server system 110 within the application layer 606 can send, at 610, a message to a RESTful engine 606 connected to the server system 110, wherein this message can include a request for a uniform resource locator (URL) to a location of a file that is to be filled/written with the historical data. The RESTful engine 606 can execute a RESTful service to fetch historical data from current and previous instances of the business intelligence report 106.

The RESTful engine 606 can send, at 612 and to a server computer (not shown) storing the business intelligence reports 106, a message requesting identifiers identifying past instances of one or more business intelligence reports 106. In response, the RESTful service executed by the RESTful engine 606 can search the one or more databases 114 for the past instances of the one or more business intelligence reports 106 to generate and send, at 614 and to the RESTful engine 606, one or more identifiers identifying past instances of those one or more business intelligence reports 106. The one or more identifiers can be stored identifiers that can uniquely identify the business intelligence report 106 so as to distinguish the business intelligence report 106 from other reports in the business intelligence platform. Subsequently, the RESTful engine 606 can send, at 616, a message requesting data of one or more selected rows, historical data of which has been requested by clicking/selecting the Generate Historical Data button 309. In response, the RESTful service executed by the RESTful engine 606 can search the past instances stored in the one or more databases 114 to retrieve, at 618, the historical data associated with the selected rows.

The RESTful engine 606 can then write, at 620, the retrieved row data to a file, such as a comma separated values (CSV) file. The RESTful engine 606 can store this file in a database 114. The RESTful engine 606 can determine a location of storage of the file, and can then generate, at 622, a uniform resource locator (URL) identifying the location of the storage. The RESTful engine 606 can then send, at 624 and 626, the URL to the client browser 602 of the computing device 102 via the application layer 604. When the user 108 selects (for example, clicks) the URL, the client browser 602 can display the file to the user 108.

Figure 7:
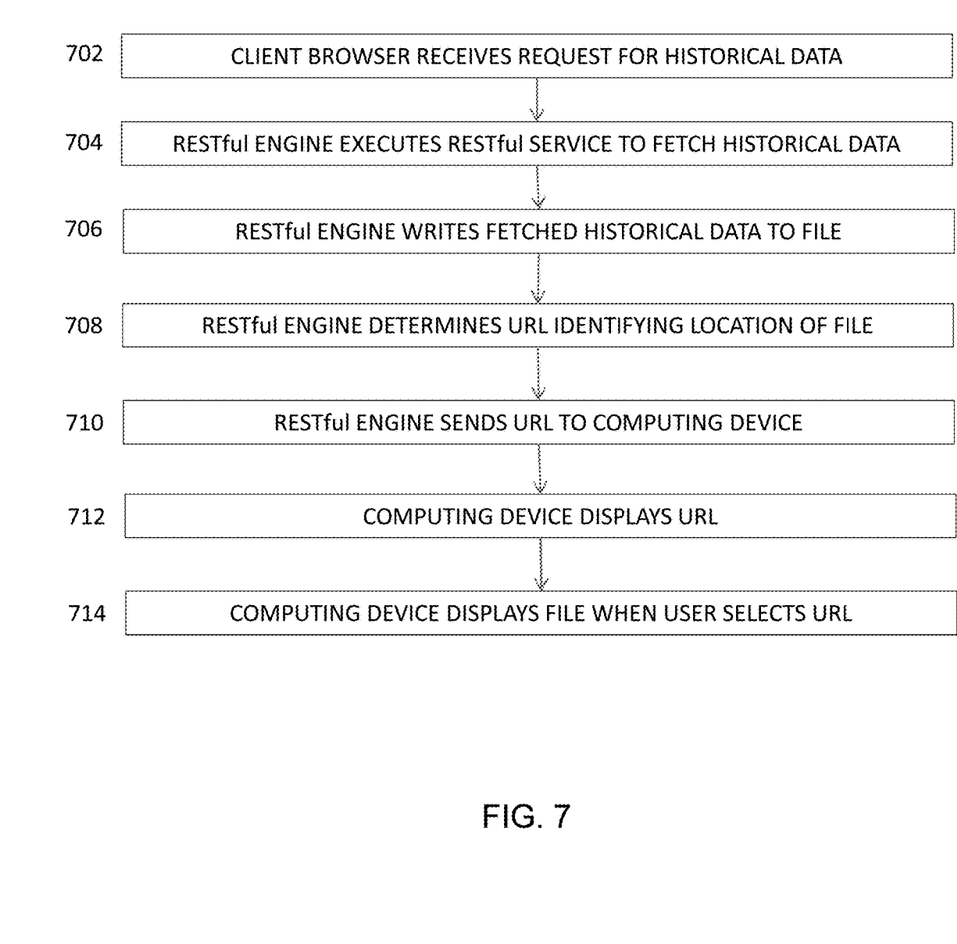
FIG. 7 is a process flow diagram illustrating a method for displaying of historical data associated with data values within a business intelligence report.

FIG. 7 is a flow-diagram 700 illustrating a method for displaying of historical data associated with data values within a business intelligence report 106. The graphical user interface 302 executed by a client browser 602 of a computing device 102 can receive, at 702 and from a user 108, a request for display of historical data associated with a specified/selected data value 310. Subsequently, a RESTful engine 606 connected to a server system 110 that is connected to the client browser 602 can execute a RESTful service to fetch, at 704, historical data from current and past instances associated with the data value 310. Then, the RESTful engine 606 can write, at 706, the fetched historical data in a file, such as a comma separated values (CSV) file. The RESTful engine 606 can determine, at 708, a uniform resource locator (URL) identifying a location of the file. The RESTful engine 606 can send, at 710, the URL to the computing device 102. The client browser 602 of the computing device can display, at 712, the URL. The client browser 602 can display, at 714, the file when the user 108 selects the URL.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:

1. A method comprising:
   receiving, at a client browser of a computing device, a first request to display historical data associated with one or more data values of a business intelligence report;
   sending, by the computing device to a server system executed in an application layer, a second request for generating the historical data in response to the first request, the server system sending to a representational state transfer engine a third request for a uniform resource locator identifying a location of a file to be filled with the historical data in response to the second request, the representational state transfer engine executing in response to the third request a representational state transfer service to fetch the historical data from past instances of the business intelligence report and to fill the file with the historical data, the representational state transfer service generating the uniform resource locator specific to the third request, the representational state transfer engine sending the uniform resource locator to the server system;

receiving, by the computing device and from the server system, the uniform resource locator; and displaying the uniform resource locator on the client browser of the computing device, the file with the historical data being displayed on the client browser when the uniform resource locator is selected.

2. The method of claim 1, wherein the file is a comma separated values (CSV) file.

3. The method of claim 1, wherein the uniform resource locator is a web link.

4. The method of claim 1, wherein the fetching of the historical data and the filling of the file with the historical data comprises:

obtaining, at the representational state transfer engine, past instances of the business intelligence report;

generating, by the representational state transfer engine, identifiers identifying the past instances;

fetching, by the representational state transfer engine, data included in associated rows of the past instances identified by the identifiers; and writing, by the representational state transfer engine, the fetched data in the file.

5. The method of claim 1, wherein the representational state transfer engine comprises at least one data processor that executes the representational state transfer service.

6. The method of claim 1, wherein the representational state transfer service is a computing application hosted by the server system to fetch and deliver the historical data to the computing device.

7. The method of claim 1, wherein the past instances of the business intelligence report are saved in one or more databases connected to the server system.

8. The method of claim 1, wherein the computing device is connected to the server system via a communication network.

9. The method of claim 8, wherein the communication network is Internet.

10. The method of claim 1, wherein the historical data in the file is displayed on the client browser in a graphical format, the graphical format being at least one of: a bar chart, a pie-chart, and a hierarchical tree structure.

11. A method comprising:

executing a representational state transfer engine on one or more processors;

fetching, by the representational state transfer engine in response to receipt of a request from a server system for a uniform resource locator identifying a location of a file to be filled with historical data, the historical data from past instances of a report to fill the file with the historical data;

generating, by the representational state transfer engine, the uniform resource locator specific to the request; and sending, by the representational state transfer engine, the uniform resource locator to the server system for use by a client browser of a computing device from which the server system received the request to cause the client browser to display the file with the historical data being when the uniform resource locator is selected.

12. The method of claim 11, wherein the filling of the file with the historical data comprises:

writing, by the representational state transfer engine, the fetched historical data in the file.

13. The method of claim 11, wherein the report is executed on an operating system of the computing device, the operating system being independent of a structure of the report.

14. A system comprising:

a computing device comprising a client browser to receive a request to display historical data associated with one or more data values of a business intelligence report, the historical data being displayed on the client browser in a graphical format, the graphical format being at least one of: a bar chart, a pie-chart, and a hierarchical tree structure, the computing device comprising at least one processor; and a server system connected to the computing device via a communication network, the server system receiving the request to display historical data, the server system executing a representational state transfer engine executing in response to a second request from the server system to the representational state transfer engine for a uniform resource locator identifying a location of a file to be filled with the historical data a representational state transfer service to fetch the historical data from past instances of the business intelligence report and to fill the file with the historical data, the representational state transfer service generating the uniform resource locator that identifies the location of the file filled with the historical data, the server system sending a uniform resource locator identifying a location of the file to the computing device, the computing device displaying the uniform resource locator on the client browser, the server system comprising at least one processor.

15. The system of claim 14, further comprising:

at least one database to store the past instances of the business intelligence report.

16. The system of claim 14, wherein the file is a comma separated values (CSV) file.

17. The system of claim 14, wherein the uniform resource locator is a web link.

18. The system of claim 14, wherein the client browser is displayed on a display screen of the computing device.

* * * * *